US010921629B1

(12) United States Patent
Otagaki et al.

(10) Patent No.: US 10,921,629 B1
(45) Date of Patent: Feb. 16, 2021

(54) METHODS AND APPARATUS FOR INCREASED SENSITIVITY OF A CAPACITIVE SENSOR

(71) Applicant: SEMICONDUCTOR COMPONENTS INDUSTRIES, LLC, Phoenix, AZ (US)

(72) Inventors: Takayasu Otagaki, Ota (JP); Kazuyoshi Ishikawa, Kumagaya (JP)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 0 days.

(21) Appl. No.: 16/667,275

(22) Filed: Oct. 29, 2019

Related U.S. Application Data

(60) Provisional application No. 62/890,196, filed on Aug. 22, 2019.

(51) Int. Cl.
*G02F 1/1333* (2006.01)
*G02F 1/1362* (2006.01)
*G02F 1/1343* (2006.01)

(52) U.S. Cl.
CPC .... *G02F 1/13338* (2013.01); *G02F 1/134363* (2013.01); *G02F 1/136286* (2013.01)

(58) Field of Classification Search
CPC ........... G02F 1/13338; G02F 1/134363; G02F 1/136286
See application file for complete search history.

(56) References Cited

U.S. PATENT DOCUMENTS

| | | | |
|---|---|---|---|
| 2008/0033691 A1* | 2/2008 | Launay | B60R 21/01532 702/158 |
| 2010/0045632 A1* | 2/2010 | Yilmaz | G06F 3/041661 345/174 |
| 2015/0130749 A1* | 5/2015 | Binstead | G06F 3/0443 345/174 |
| 2017/0115786 A1* | 4/2017 | Kimura | G02F 1/1368 |
| 2017/0277294 A1* | 9/2017 | Wang | G06F 3/0445 |

* cited by examiner

*Primary Examiner* — Amare Mengistu
*Assistant Examiner* — Jennifer L Zubajlo
(74) *Attorney, Agent, or Firm* — The Noblitt Group, PLLC; Gary W. Newon

(57) ABSTRACT

Various embodiments of the present technology may comprise methods and apparatus for increased sensitivity of a capacitive proximity sensor. The method and apparatus may comprise a sense electrode and a drive electrode configured to create at least one inflection point corresponding to an increase or decrease in rate of change of capacitance within one or more sensing regions of the electrical field of the capacitive sensor. In alternative embodiments, the sense electrode may be configured to create multiple zones that may be used to indicate a desired signal such an upcoming replacement period and a replace now period.

20 Claims, 9 Drawing Sheets

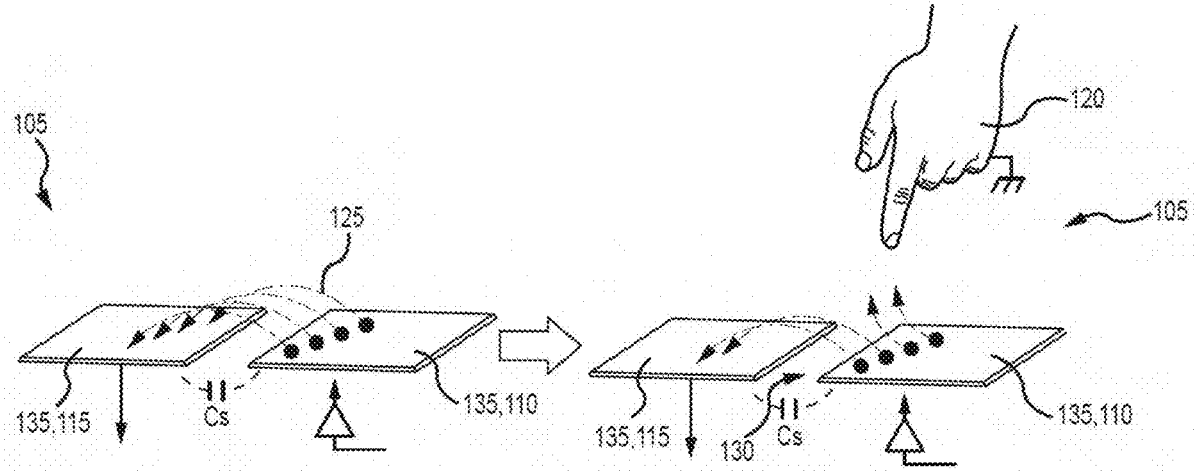

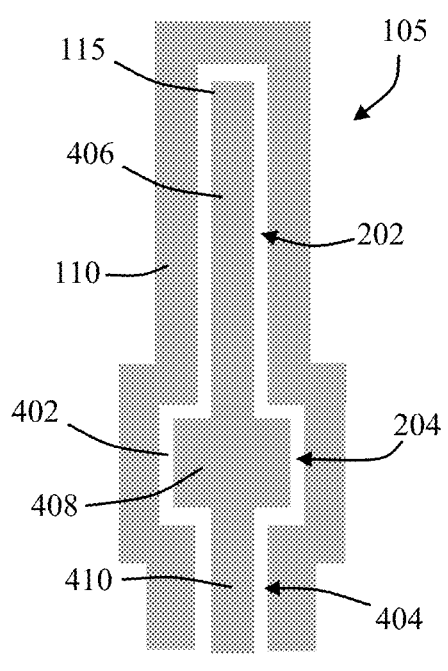
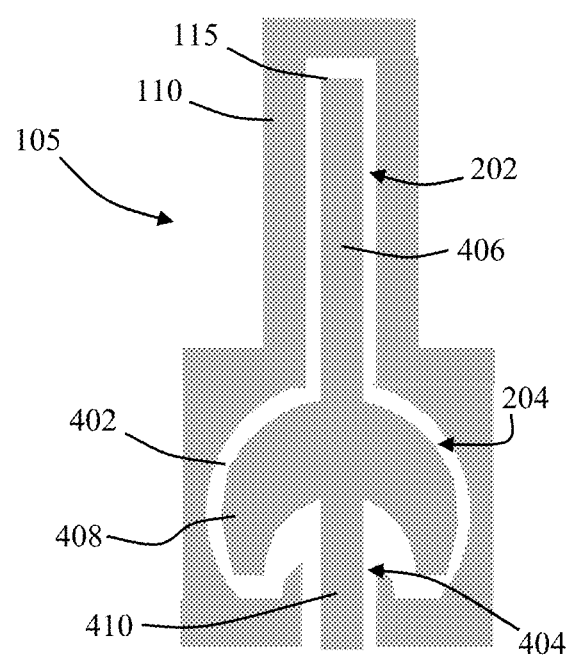
Figure 4  Figure 5

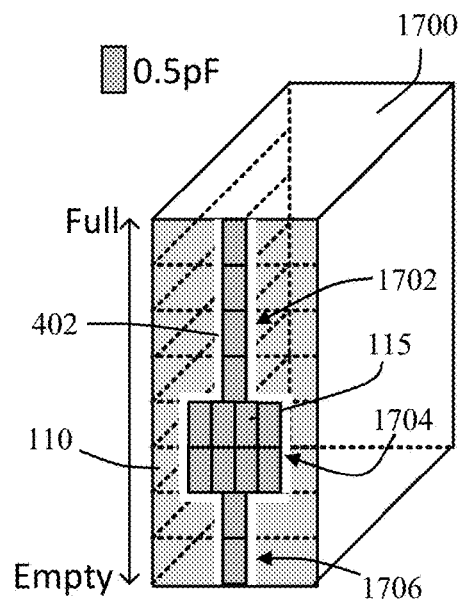
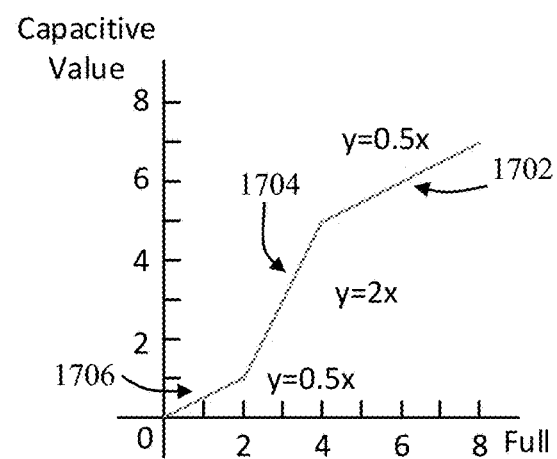
Figure 17
Figure 18
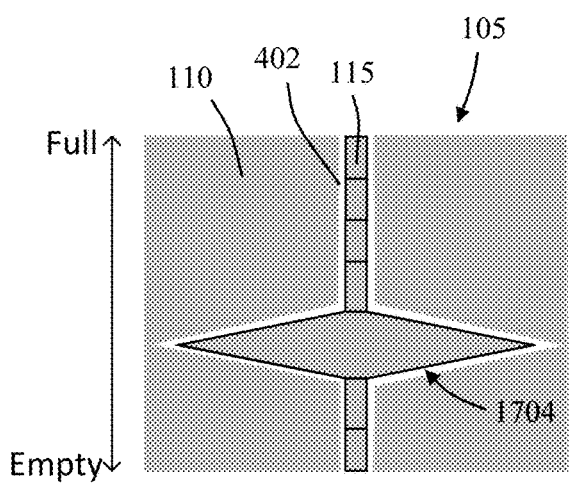
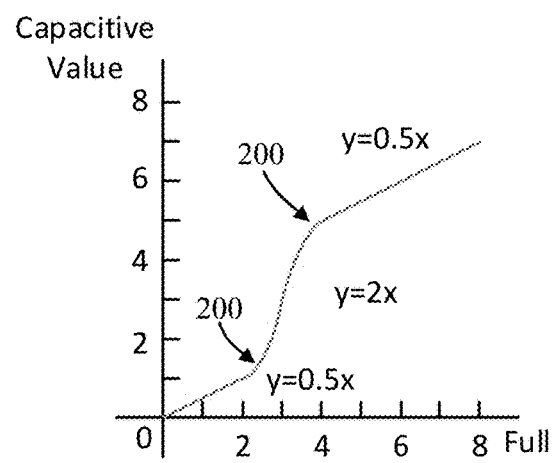
Figure 19
Figure 20

METHODS AND APPARATUS FOR INCREASED SENSITIVITY OF A CAPACITIVE SENSOR

CROSS-REFERENCE TO RELATED APPLICATIONS

This application claims the benefit of U.S. Provisional Patent Application No. 62/890,196, filed on Aug. 22, 2019, the entire contents of which is incorporated herein by reference.

BACKGROUND OF THE TECHNOLOGY

Capacitive sensors operate by detecting changes in the capacitance formed between a drive electrode and a sense electrode. A sensing circuit can recognize an object and determine the location, pressure, direction, speed and acceleration of the object as it is approaches and/or moves through an electrical field generated between the two electrodes.

Mutual capacitance touch sensors have the ability to detect proximity events, in which an object is not touching the sensing surface, but is in close proximity to the sensing surface. Therefore, electronic devices incorporating capacitive sensors allow an object to be detected when it is positioned relative to a capacitive sensing element. The mutual capacitive touch sensor operates by measuring the capacitance of the capacitive sense element, and looking for a change in capacitance indicating the presence of a conductive object. When the conductive object comes into close proximity with a capacitive sense element, the capacitance changes and the conductive object is detected. An electrical circuit may be utilized to measure the change in capacitance of the capacitive touch sense element, and the electrical circuit may convert the measured capacitance of the capacitive sense element into a digital value.

Capacitive sensors may also be utilized to measure a volume and/or a level of some material, such as fluids, within a container. Capacitive sensors utilized in such applications may provide a more accurate measurement and may be more reliable than conventional mechanical indicators. Despite these improvements, in some applications, capacitive sensors may be subject to errors introduced by factors such as environmental conditions and physical placement/orientation of the objects within the electrical field.

SUMMARY OF THE TECHNOLOGY

Various embodiments of the present technology may comprise methods and apparatus for increased sensitivity of a capacitive proximity sensor. The method and apparatus may comprise a sense electrode and a drive electrode configured to create at least one inflection point corresponding to an increase or decrease in rate of change of capacitance within one or more sensing regions of the electrical field of the capacitive sensor. In alternative embodiments, the sense electrode may be configured to create multiple zones that may be used to indicate a desired signal such an upcoming replacement period and a replace now period.

BRIEF DESCRIPTION OF THE DRAWINGS

A more complete understanding of the present technology may be derived by referring to the detailed description and claims when considered in connection with the following illustrative figures. In the following figures, like reference numbers refer to similar elements and steps throughout the figures.

FIGS. 1A and 1B representatively illustrate a capacitive proximity sensor in accordance with a first exemplary embodiment of the present technology;

FIG. 4 representatively illustrates a sensing element in accordance with an exemplary embodiment of the present technology;

FIG. 5 representatively illustrates an alternative embodiment of the sensing element in accordance with an exemplary embodiment of the present technology;

FIG. 17 representatively illustrates a sensing element used in conjunction with a liquid tank in accordance with an exemplary embodiment of the present technology;

FIG. 18 graphically illustrates the sensing element of FIG. 17 and two inflection points in accordance with an exemplary embodiment of the present technology;

FIG. 19 representatively illustrates an alternative embodiment of the sensing element in accordance with an exemplary embodiment of the present technology; and FIG. 20 graphically illustrates the sensing element of FIG. 19 and two inflection points in accordance with an exemplary embodiment of the present technology.

Figure 2A:
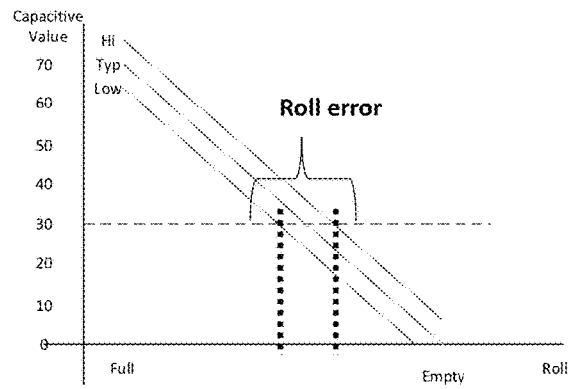
FIG. 2A representatively illustrates a first form of error in a prior art sensing system.

Elements and steps in the figures are illustrated for simplicity and clarity and have not necessarily been rendered according to any particular sequence. For example, steps that may be performed concurrently or in a different order are illustrated in the figures to help to improve understanding of embodiments of the present technology.

DETAILED DESCRIPTION OF EXEMPLARY EMBODIMENTS

The present technology may be described in terms of functional block components and circuit diagrams. Such functional blocks and circuit diagrams may be realized by any number of components configured to perform the specified functions and achieve the various results. For example, the present technology may employ various types of capacitors, amplifiers, power sources, and the like, which may carry out a variety of functions. The methods and apparatus for a capacitive proximity sensor according to various aspects of the present technology may operate in conjunction with any electronic device and/or device input source, such as a printing device, a liquid tank, dry powder or granular container, paper trays, or any other device having a depletable resource that is replaced or refilled when empty.

Referring to FIGS. 1A and 1B, in various embodiments of the present technology, a capacitive sensor may detect an object by measuring a change in a capacitance and/or an output voltage (Vout) of the sensor. In various embodiments, the capacitive sensor may comprise a sensing element 105 and operational circuitry that operate in conjunction to create a sensing field 125 and measure changes in the sensing field 125.

The capacitive sensor may generate the sensing field 125, such as an electric field, above a surface of the sensing element 105. In various embodiments, the capacitive sensor may operate as a proximity sensor to detect a position or change of position of an object within the sensing field 125. The sensing field 125 may form in a region between the surface of the sensing element 105 and a predetermined distance above the surface of the sensing element 105, where the sensing element 105 may detect an object 120, such as a human fingertip, a pen point, an edge of a roll of per, a top surface of a stack of paper, an upper surface of a liquid, an upper surface of a container holding a powder or other dry good, or the like, when it enters or moves within the sensing field 125. As such, the object 120 may not need to physically touch the sensing element 105 to effect a change in the capacitance.

In various embodiments, the capacitive sensor detects the object 120 by measuring and/or detecting changes in a resting capacitance and the output voltage of the sensing element 105 as a result of a change in location of the object 120 within the sensing field 125.

The sensing element 105 produces the sensing field 125 and responds to objects changing position within the sensing field 125. The sensing element 105 may comprise any suitable device or system responsive to the sensing field 125. The sensing element 105 may be formed within an insulation substrate (not shown), such as a PCB substrate in an electronic device, like a point of sale (POS) machine. For example, in various embodiments, the sensing element 105 may comprise a plurality of electrodes 135 suitably configured to form the sensing field 125. In various embodiments, at least one electrode 135 may comprise a drive electrode 110 (i.e., a transmission electrode) and at least one electrode 135 may comprise a sense electrode 115 (i.e., a reception electrode), wherein the drive electrode 110 and the sense electrode 115 form a sensing capacitor Cs. The electrodes 135 may have any physical arrangement and may be formed of any shape or size for a particular application.

In an exemplary embodiment, the sensing element 105 may comprise a pair of coplanar electrodes. In the present embodiment, a first electrode may comprise the drive electrode 110 and a second electrode may comprise the sense electrode 115, wherein the first and second electrodes together form the sensing capacitor Cs. For example, and referring now to FIGS. 4-6, the sensing element 105 may comprise a surface area, wherein the sense electrode 115 is at least partially enclosed or surrounded by the drive electrode 110. The drive electrode 110 and the sense electrode 115 may be separated by a dielectric 402.

Referring now to FIG. 2A, prior art sensing elements used to detect an amount of remaining paper (x-axis) on a roll of printer paper may experience reading error caused by environmental factors such as temperature and humidity. At a given temperature and/or humidity level, a reading offset may be created at any generated capacitance level (y-axis) within the sensing field 125. For example, at a capacitance level of about 30 pF a prior art sensing system may experience substantial error in relation to an actual amount of remaining paper depending on the current environmental conditions being experienced and a predicted amount of remaining paper. If the environmental conditions change, the error may change causing additional uncertainty into the actual amount of paper remaining on the roll of printer paper. As the paper roll continues towards an empty state, the error in the readings may continue as the detected capacitance of the sensing system decreases.

Figure 3A:
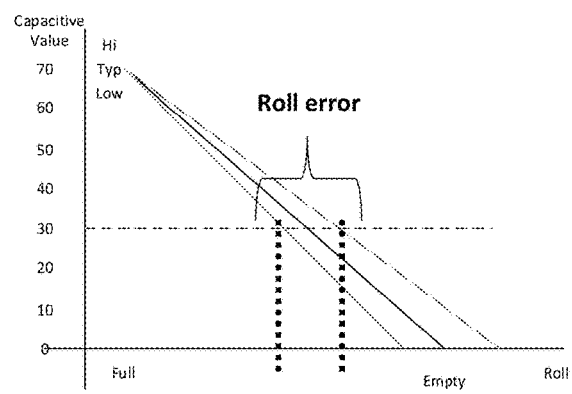
FIG. 3A representatively illustrates a second form of error in a prior art sensing system.

Similarly, and referring now to FIG. 3A, prior art sensing elements may experience reading error introduced by slight variations in the physical placement of the roll of printer paper within the printing device. For example, a slight change in position within the housing of the POS machine may alter an angle of inclination between the sensing element 105 and the roll of printer paper. Again, at any given capacitance value, the change in inclination may introduce a significant amount of error between the detected amount of remaining paper and the actual amount of remaining paper on the roll of printer paper. Each type of error may lead to the premature replacement of a roll of paper due or the roll of paper unexpectedly running out prior to the detection system indicating that it is time to replace the roll of printer paper.

Figure 2B:
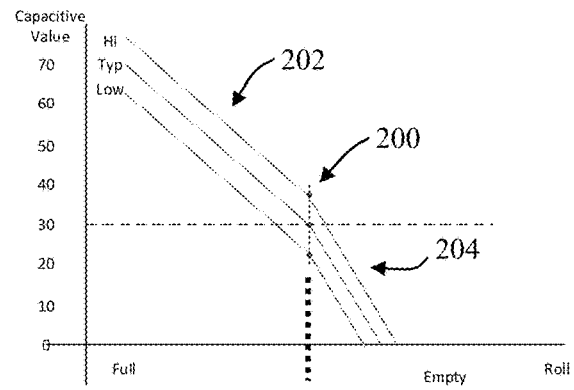
FIG. 2B representatively illustrates an inflection point within a sensing field to compensate for the first form of error of the prior art system in accordance with an exemplary embodiment of the present technology.
Figure 3B:
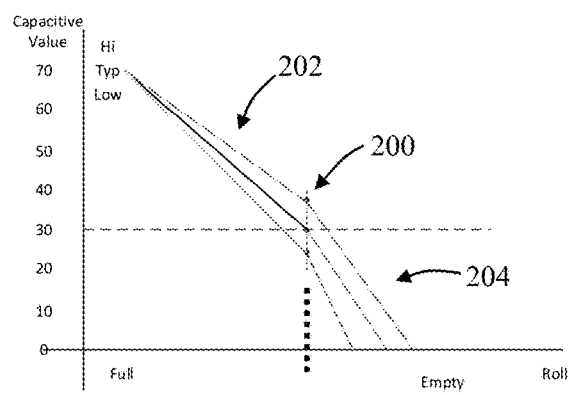
FIG. 3B representatively illustrates an inflection point within a sensing field to compensate for the second form of error of the prior art system in accordance with an exemplary embodiment of the present technology.

Referring now to FIGS. 2B and 3B, the sensing element 105 may be configured to reduce error by creating a sensing field 125 having at least two different sensing regions, wherein each region comprises a rate in the change of capacitance (increasing or decreasing) detected that corresponds to a change in the amount of remaining paper on the roll of printer paper within that sensing region. In one embodiment, the sensing field 125 may comprise a first sensing region 202 having a first rate of change in capacitance and a second sensing region 204 having a second rate of change in capacitance. The second rate of change in capacitance may be greater than or less than the rate of the first sensing region 202 and may be determined according to any desired criteria.

The first and second sensing regions 202, 204 may correspond to any desired condition relating to the detected object 120. For example, in an embodiment where the object 120 comprises a roll of printer paper, the first sensing region 202 may correspond to an abundant period where there is a sufficient amount of remaining paper on the roll, such as the period following the installation of a new roll of printer paper. The second sensing region 204 may correspond to a replacement period, such as when there is less than about 5-10% of the roll of paper remaining. Additional sensing regions may also be used to identify one or more intermediate periods between the abundant and replacement periods according to a particular application or desired accuracy.

An inflection point 200 is created between the first and second sensing regions 202, 204 as a result of a difference in the rate of change of capacitance corresponding to each sensing region 202, 204. The inflection point 200 occurs at the same point along the x-axis regardless of the condition that would introduce errors in the prior art systems. This greatly reduces or eliminates any variation in the calculated amount of remaining paper for a given capacitance level. The sensing element 105 may be configured with any suitable number of inflection points 200 depending on any desired criteria such as: a desired number of sensing regions; accuracy of the sensing regions, a desired length of time for a given sensing region, and the like.

Referring now FIG. 4, in one embodiment the sensing element 105 may be configured such that a size and shape of the sense electrode 115 forms at least a portion of the first and second sensing regions 202, 204. In one embodiment the first sensing region 202 may comprise a first size and shape configured to create the first rate of capacitance change and the second sensing region 204 may comprise a different size and/or shape that is configured to create the second rate of capacitance change. Similarly, a third sensing region 404 may comprise yet another size and shape that is different from the second sensing region 204 to generate a third rate of capacitance chance. The third rate of capacitance change may be the same as or different than the first rate of capacitance change such that a second inflection point 200 is created between the second and third sensing regions 204, 404.

For example, an upper portion 408 of the sense electrode 115 that forms the first sensing region 202 may comprise a substantially rectangular shape. This upper portion 406 may terminate at a middle portion 408 of the sense electrode 115 that forms the second sensing region 204 and comprises a rectangular shape that is wider than the upper portion 406. The middle portion 408 may terminate at a lower portion 410 of the sense electrode 115 that forms the third sensing region 404 and comprises a rectangular shape that is narrower than the middle portion 408.

Figure 6:
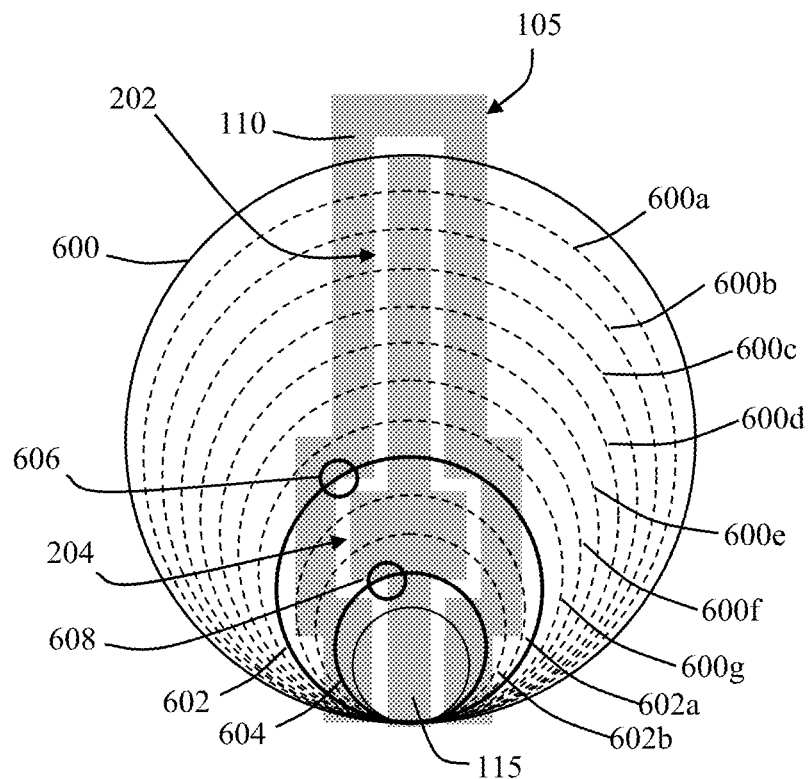
FIG. 6 representatively illustrates the sensing element of FIG. 4 positioned proximate a roll of paper in accordance with an exemplary embodiment of the present technology.
Figure 7:
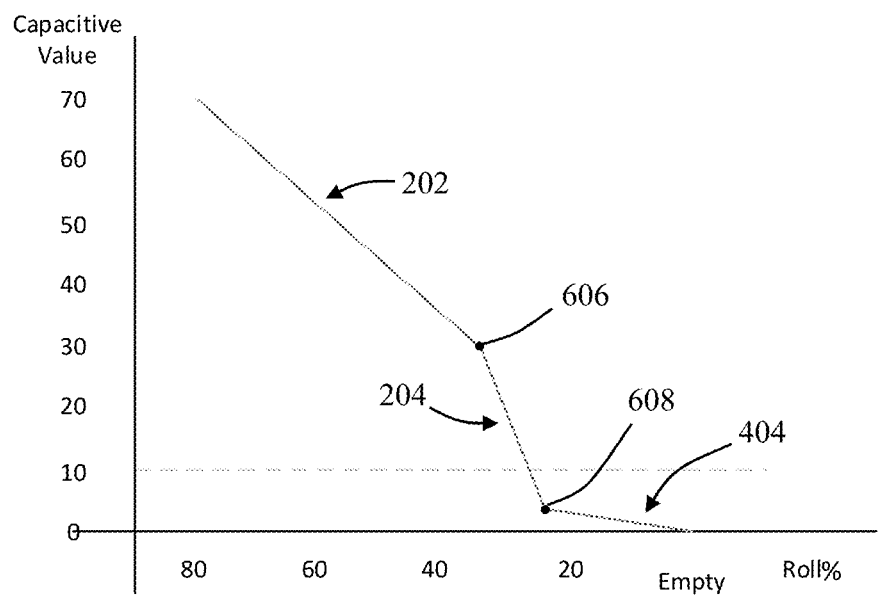
FIG. 7 graphically illustrates the sensing element of FIG. 6 and two inflection points in accordance with an exemplary embodiment of the present technology.

Referring now to FIG. 6, if a full roll of printer paper 600 is overlaid on or positioned proximate the sensing element 105, an outer edge (diameter) of the full roll of paper 600 fully covers the sense electrode 115. As paper is used a center core of the roll of printer paper moves downward at the same time an outer diameter of the roll of printer paper gets smaller. As a result, the outer edge of the roll of paper (600a, 600b, 600c, 600d, 600e, 600f, and 600g) covers less of the first sensing region 202. The first sensing region 202 may be configured to generate a predictable rate of decrease in the capacitance detected in the sensing field 125. Referring now to FIGS. 6 and 7, as the outer edge (diameter) of the roll of paper gets smaller less of the first sensing region 202 is covered resulting in a substantially linear decrease in a capacitance curve of the sensing field 125. The rate of change in the first sensing region 202 may be expressed by the equation:

$$\frac{dy1}{dx1} \qquad \text{eq. 1}$$

As more paper is used the outer edge continues to decrease until reaching a first transition diameter 602 that corresponds to a first inflection point 606. Because the second sensing region 204 comprises a different shape and size than the first sensing region 202, the rate of change in capacitance in the second sensing region 204 is increased causing the slope of the capacitance curve to become steeper than the curve in the first sensing region 202. The rate of change in the second sensing region 204 may be expressed by the equation:

$$\frac{dy2}{dx2} \qquad \text{eq. 2}$$

such that:

$$\frac{dy1}{dx1} < \frac{dy2}{dx2} \qquad \text{eq. 3}$$

As more paper is used and the outer diameter of the roll of paper gets smaller the outer edge of the roll of paper (602a, 602b) covers less of the second sensing region 204 until reaching a second transition diameter 604 that corresponds to a second inflection point 608. The third sensing region 404 may comprise yet another size and/or shape configured to create a change in the rate of capacitance change that may either increase or decrease the slope of the capacitance curve. For example, the second inflection point 608 may indicate a decrease in the rate of capacitance change and may be expressed by the equation:

$$\frac{dy3}{dx3} \qquad \text{eq. 4}$$

such that:

$$\frac{dy2}{dx2} > \frac{dy3}{dx3}. \qquad \text{eq. 5}$$

In this example, the first sensing region 202 may correspond to the abundant period described above and the second sensing region 204 may correspond to a period indicative that a replacement period is approaching. The third sensing region 404 may correspond to a replacement period indicating to a user that the roll of paper needs to be replaced but is not yet completely empty. It should also be understood that the slope (rate of change of capacitance) of each sensing region 202, 204, 404 may comprise any suitable value that creates an inflection point 200. Similarly, the sensing regions 202, 204, 404 may also be configured to generate either an increase or a decrease in capacitance.

Figure 8:
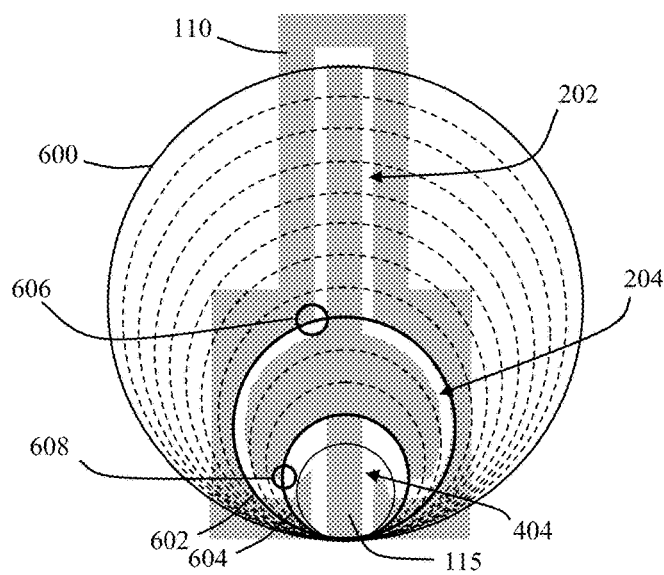
FIG. 8 representatively illustrates the sensing element of FIG. 5 positioned proximate a roll of paper in accordance with an exemplary embodiment of the present technology.

Referring now to FIGS. 5 and 8, in an alternative embodiment, the shape of the sensing element 105 may be configured to provide greater accuracy. For example, at least a portion of the drive electrode 110 and the sense electrode 115 may comprise a shape that more closely resembles the object being detected. In the case of a roll of printer paper, the sense electrode 115 may be rounded to better conform to the outer edge of the roll of paper. Similarly, an inner edge of the drive electrode 110 near the middle portion 408 may also be rounded to better conform to the roll of paper.

Figures 9A, 9B, 9C:
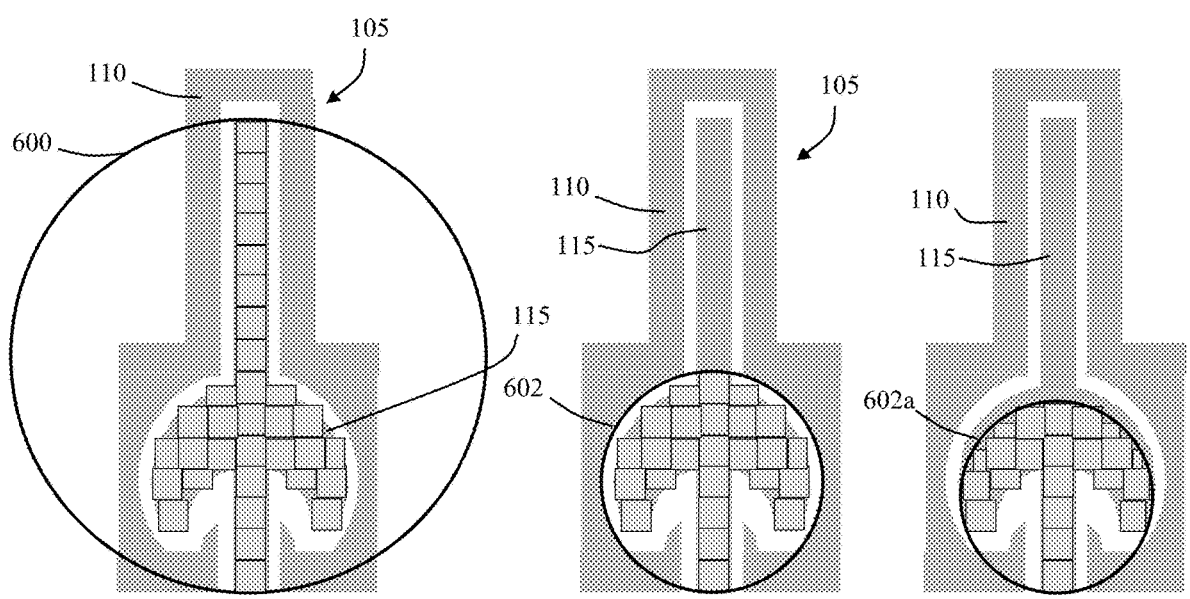
FIGS. 9A-9C representatively illustrate the change in capacitance according to the detected outer edge of the roll of paper by the sensing element of FIG. 5 in accordance with an exemplary embodiment of the present technology.

By conforming the electrodes of the sensing element 105 it may be possible to identify smaller changes in the remaining amount of the object 120 being detected thereby increasing accuracy of the sensing system as a whole or to provide more discrete inflection points 200. For example, and referring now to FIGS. 9A, 9B, and 9C, when the full roll of paper 600 is positioned proximate the sensing element 105, the entirety of the sense electrode 115 is covered by the roll of paper (FIG. 9A). When the outer edge of the roll of paper reaches a diameter equal to the first transition diameter 602 that corresponds to the first inflection point 606 only the middle and lower portions 408, 410 of the sense electrode 115 are covered. As the outer edge of the roll of paper gets smaller (602a) less of the middle portion 408 of the sense electrode 115 is covered, but because the middle portion 408 is rounded a more accurate reading can be achieved.

The size and shape of the electrodes of the sensing element 105 may also be determined, at least in part, by the material used to form the electrodes. For example, one substrate may allow for a smoothly curving edge along the sense electrode 115 while another substrate may only allow for orthogonally edged electrodes.

Figure 10:
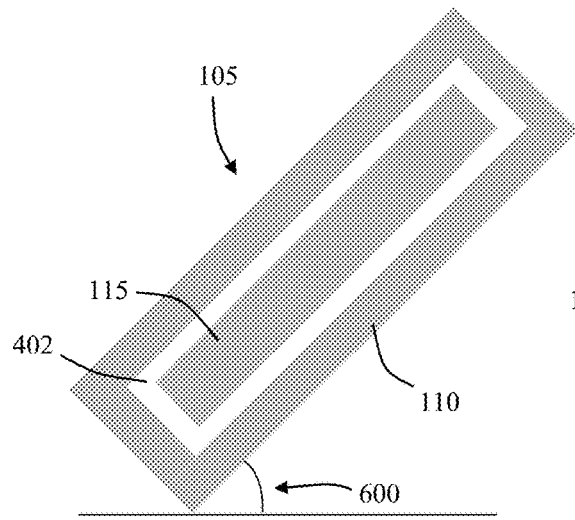
FIG. 10 representatively illustrates a third embodiment of the sensing element in accordance with an exemplary embodiment of the present technology.

Referring now to FIG. 10, in another embodiment the sensing element 105 may comprise a sense electrode 115 that is completely enclosed by the drive electrode 110. Further, the sensing element 105 may be set an angle 600 relative to the object 120 so that at least the first and second sensing regions 202, 204 are formed from the angle made between the object 120 and the sensing element 105. For example, setting the sensing element 105 at an angle relative to the outer edge of the roll of printer paper will cause the outer edge to interact with different sections of the drive and sense electrodes 110, 115 to create inflection points where the rate of change of capacitance changes.

Figure 11:
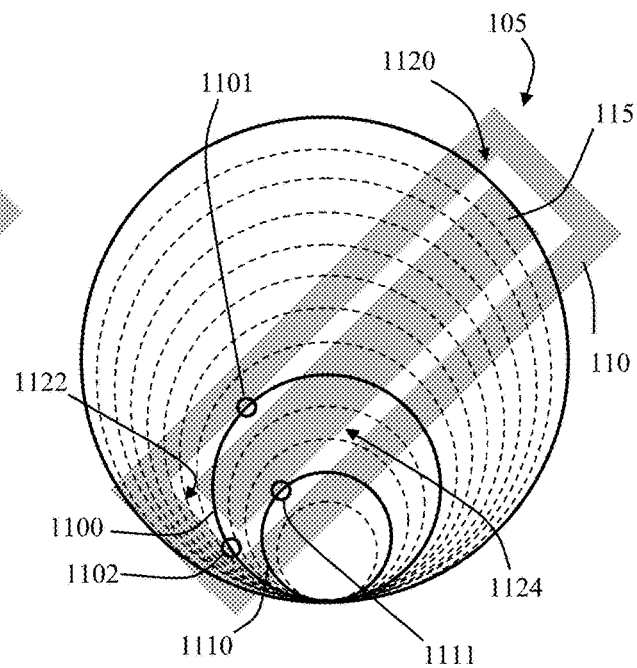
FIG. 11 representatively illustrates the sensing element of FIG. 10 positioned proximate a roll of paper in accordance with an exemplary embodiment of the present technology.
Figure 12:
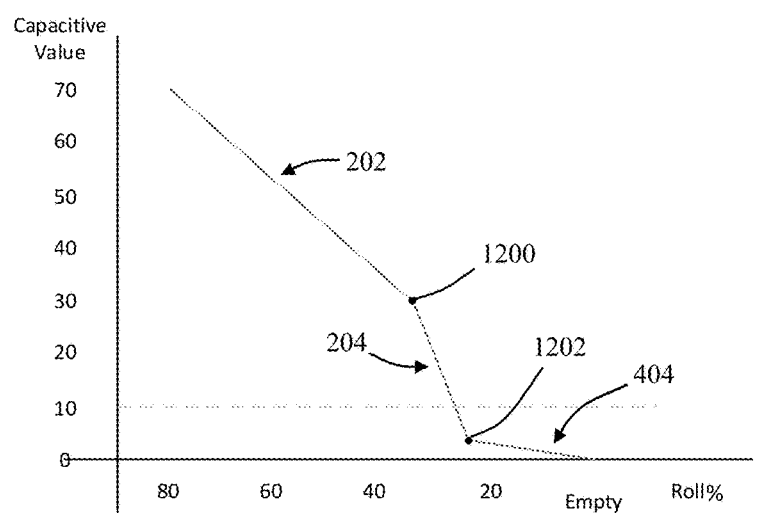
FIG. 12 graphically illustrates the sensing element of FIG. 11 and two inflection points in accordance with an exemplary embodiment of the present technology.

For example, and referring now to FIGS. 11 and 12, in the embodiment using a roll of printer paper, the sensing element 105 may be angled relative to the direction that the center core of the roll of paper is moving as paper is used and the diameter of the roll of paper is reduced. This results in the outer edge of the roll of paper engaging both the drive and sense electrodes 110, 115 by differing amounts causing inflection points in the rate of change of capacitance for the sensing element 105 as a whole. This can be seen when the diameter of the outer edge of the roll of paper decreases to a first transition diameter 1100 that corresponds to a first inflection point 1200 caused by the outer edge of the roll of paper engaging the drive electrode 110 at a single point 1101 along a first inner edge 1120 of the drive electrode 110 and at a second point 1102 along a second inner edge 1122 of the drive electrode 110.

A second inflection point 1202 is created when the outer edge of the roll of paper engages the sense electrode 115 at a single point 1111 along a first inner edge 1124 of the sense electrode 115. As with the examples above, the first and second sensing regions 202, 204 are located on opposite sides of the first inflection point 1200. Similarly, the second and third sensing regions 204, 404 are located on opposite sides of the second inflection point 1202.

Figure 13:
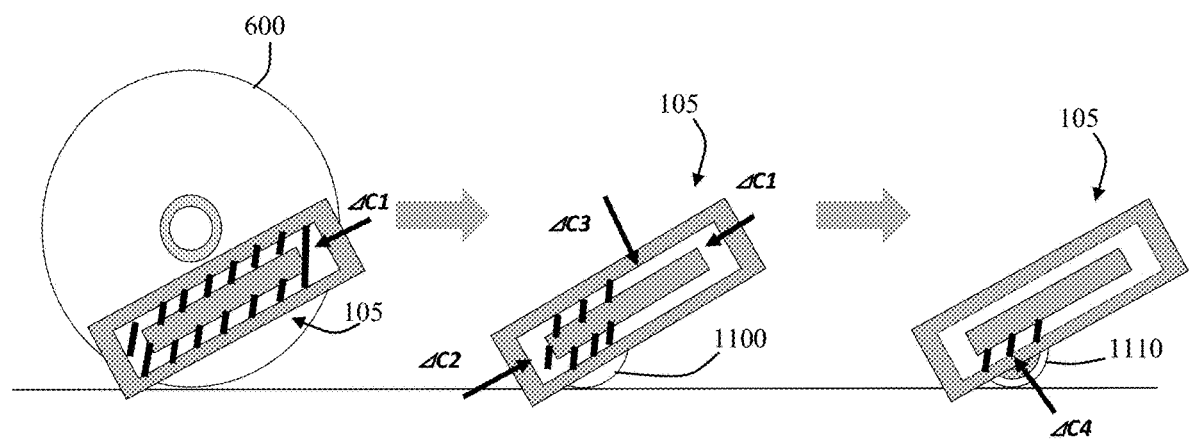
FIG. 13 representatively illustrates areas on the sensing element where capacitance is generated in accordance with an exemplary embodiment of the present technology.

Referring now to FIG. 13, when the full roll of paper 600 initially starts decreasing in diameter during use, the change in capacitance in the sensing element 105 is caused by portions of the drive and sense electrodes 110, 115 only being exposed along a first direction ΔC1. After the outer edge of the roll of paper reaches the first transition diameter 1100 the change in capacitance in the sensing element 105 is caused by portions of the drive and sense electrodes 110, 115 being exposed along three directions ΔC1, ΔC2, and ΔC3. Because the change in capacitance is occurring along multiple portions of the sensing element 105 the capacitance will change at a higher rate than prior to the first transition diameter 1100 (see FIG. 12). After the outer edge of the roll of paper reaches the second transition diameter 1110 the change in capacitance in the sensing element 105 is caused by portions of the drive and sense electrodes 110, 115 only being exposed in a single direction ΔC4 which again changes the rate of change of capacitance in the sensing element 105 (see FIG. 12).

Figure 14:
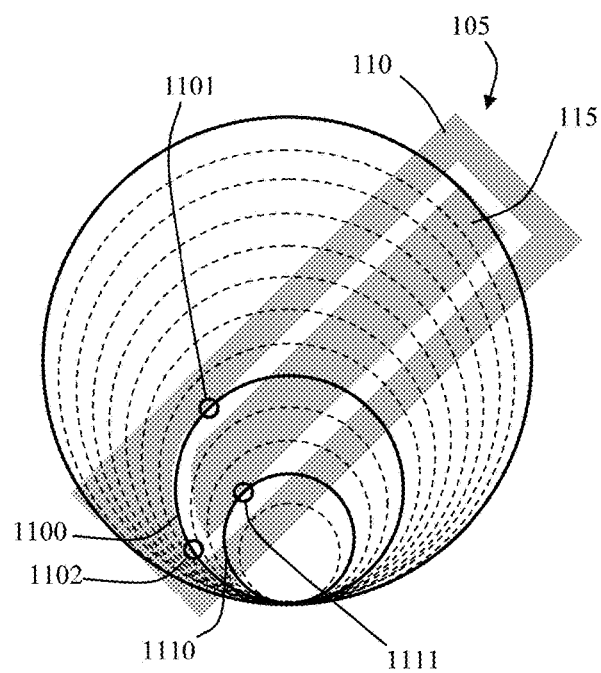
FIG. 14 representatively illustrates an alternative embodiment of the sensing element of FIG. 10 positioned proximate a roll of paper in accordance with an exemplary embodiment of the present technology.

Referring now to FIG. 14, the shape of the inner edge of the drive electrode 110 and/or the outer edge of the sense electrode 115 may be configured to provide increased accuracy. For example, a portion of both the drive and sense electrodes 110, 115 may be curved to better conform to the outer edge of the roll of paper at or near first transition diameter 1100. Similarly, a second portion of the sense electrode 115 may be curved to better conform to the outer edge of the roll of paper at or near second transition diameter 1110.

Figures 15A, 15B:
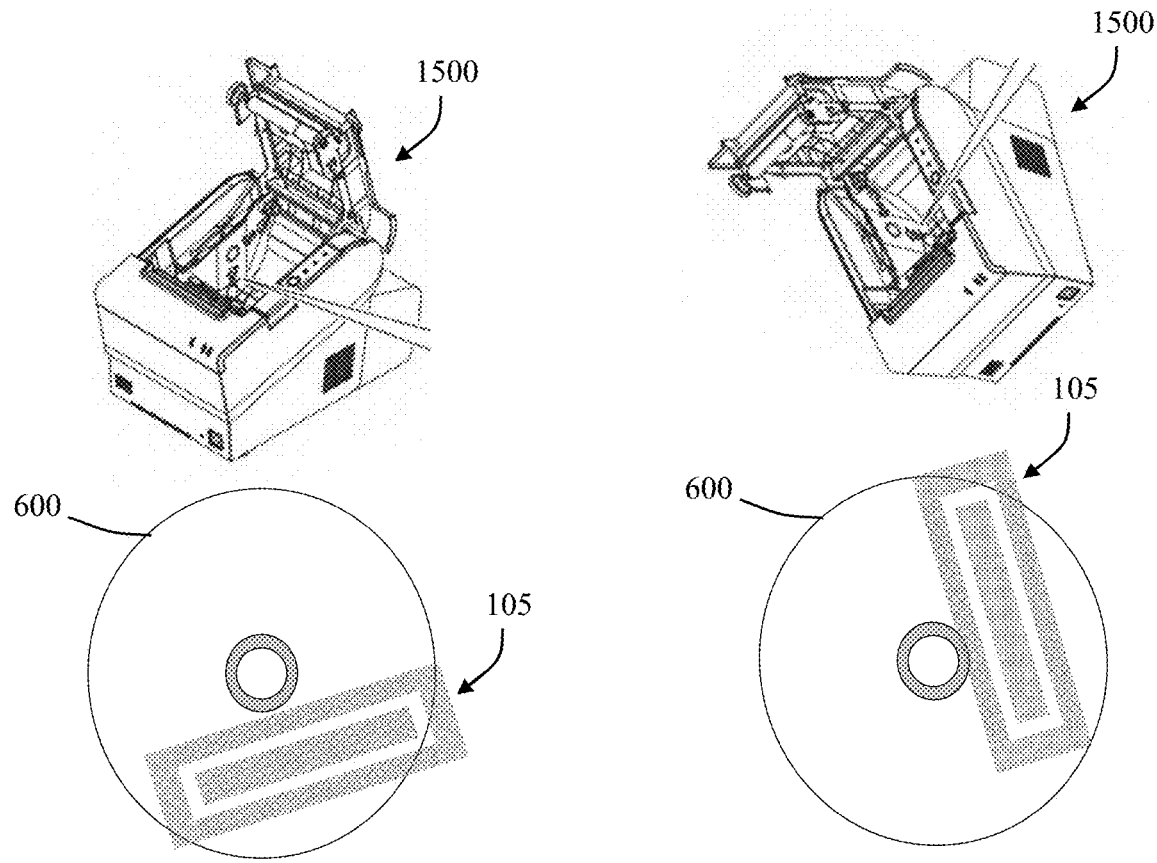
FIGS. 15A-15B representatively illustrate a change in orientation of the sensing element in relation to the roll of paper in accordance with an exemplary embodiment of the present technology.

Referring now to FIGS. 15A and 15B, during use, a POS machine 1500 may be oriented in various positions such as on a countertop (FIG. 15A) or mounted on a wall (FIG. 15B). Due to the way in which a full roll of paper 600 is positioned within the POS machine 1500 in each orientation, the roll of paper may not align with the sensing element 105 in exactly the same manner. For example, gravity may tend to pull the roll of paper more towards the front end of the POS machine 1500. This may result in an outer edge of the sensing element 105 being position closer to, or potentially overlapping, a central core of the roll of paper. Although the sensing element 105 would still function in the manner described above to create at least one inflection point to reduce error, the difference in alignment between the countertop use and the wall mounted use might introduce a new form of error.

Figure 16:
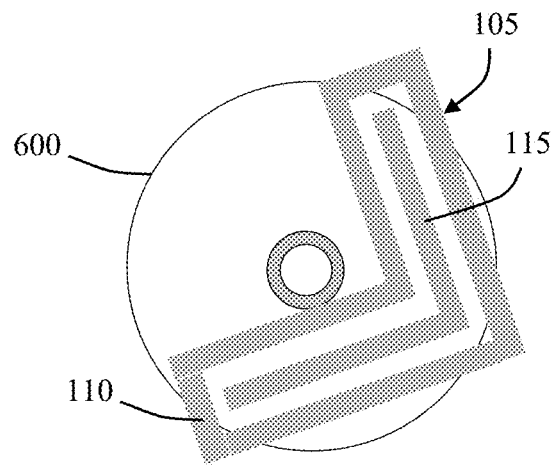
FIG. 16 representatively illustrates another embodiment of the sensing element in accordance with an exemplary embodiment of the present technology.

Referring now to FIG. 16, in one embodiment, the sensing element 105 may comprise a shape that is configured to detect the outer edge of the roll of paper in two different directions. For example, the sensing element 105 may comprise an L-shaped sense electrode 115 that is fully enclosed by the drive electrode 110. In this configuration, the rate of change of capacitance in the sensing field 125 may be detected and inflection points generated despite any positional difference of the roll of paper within the POS machine 1500.

In yet another embodiment, and referring now to FIGS. 17 and 18, the sensing element 105 may also be used in the manner described above to detect when a liquid contained within a tank is depleted from an abundant amount, to a near empty amount, and finally to a period when the tank should be refilled before running completely empty. For example, the drive and sense electrodes 110, 115 may be arranged along a height of a tank 1700. The sense electrode 115 may comprise an upper sensing region 1702, a middle sensing region 1704, and a lower sensing region 1706, wherein each sensing region comprises a different rate of change in capacitance according to a height of the liquid in the tank 1700.

Referring now to FIGS. 19 and 20, the sense electrode 115 may be also configured to provide a more gradual inflection point 200. For example, the middle sensing region 1704 may comprise a shape that generates a more gradual rate of change in capacitance.

The particular implementations shown and described are illustrative of the technology and its best mode and are not intended to otherwise limit the scope of the present technology in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

In the foregoing description, the technology has been described with reference to specific exemplary embodiments. Various modifications and changes may be made, however, without departing from the scope of the present technology as set forth. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises," "comprising," or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology.

The invention claimed is:

1. A capacitance sensor for detecting and identifying a replacement period for a roll of paper, comprising:
   a drive electrode;
   a sense electrode at least partially enclosed by the drive electrode to define a sensing field responsive to the presence of the roll of paper, wherein the sensing field comprises:
      a first sensing region having a first rate of capacitance change relative to a position of an outermost edge of the roll of paper; and
      a second sensing region having a second rate of capacitance change relative to the position of the outermost edge of the roll of paper, and wherein an inflection point is created in the sensing field where the first and second sensing regions meet; and
   a dielectric disposed between and separating the drive electrode from the sense electrode.

2. A capacitance sensor according to claim 1, wherein the second rate of capacitance change is greater than the first rate of capacitance change.

3. A capacitance sensor according to claim 1, further comprising a third sensing region having a third rate of capacitance change relative to the position of the outermost edge of the roll of paper, and wherein a second inflection point is created in the sensing field where the second and third sensing regions meet.

4. A capacitance sensor according to claim 3, wherein the third rate of capacitance change is less than the second rate of capacitance change.

5. A capacitance sensor according to claim 1, wherein the sense electrode further comprises:
   an upper portion comprising a shape corresponding to the first sensing region; and
   a middle portion comprising a second shape corresponding to the second sensing region.

6. A capacitance sensor according to claim 5, wherein the sense electrode further comprises:
   a third sensing region having a third rate of capacitance change relative to the position of the outermost edge of the roll of paper, and wherein a second inflection point is created in the sensing field where the second and third sensing regions meet; and
   a lower portion comprising a third shape corresponding to the third sensing region.

7. A capacitance sensor according to claim 5, wherein:
   an outer edge of the middle portion of the sense electrode facing the dielectric is rounded; and
   an inner edge of the drive electrode opposite the outer edge of the middle portion is rounded to at least partially conform to the outer edge of the middle portion.

8. A capacitance sensor according to claim 1, wherein the sense electrode is fully enclosed by the drive electrode.

9. A capacitance sensor according to claim 1, wherein:
   an outer edge portion of the sense electrode facing the dielectric is rounded; and
   an inner edge of the drive electrode opposite the outer edge portion of the sense electrode is rounded to at least partially conform to the outer edge portion of the sense electrode.

10. A capacitance sensor according to claim 1, wherein the drive and sense electrodes form an L-shape.

11. A capacitance sensor for detecting and identifying a replacement period for an object, comprising:
   a drive electrode; and
   a sense electrode at least partially enclosed by the drive electrode to define a sensing field responsive to the object, wherein the sense electrode comprises:
      a first sensing region having a first rate of capacitance change relative to a change of position of the object within the sensing field; and
      a second sensing region having a second rate of capacitance change relative to the change of position of the object within the sensing field, and wherein an inflection point is created in the sensing field where the first and second sensing regions meet.

12. A capacitance sensor according to claim 11, further comprising a third sensing region having a third rate of capacitance change relative to the change of position of the object within the sensing field, and wherein a second inflection point is created in the sensing field where the second and third sensing regions meet.

13. A capacitance sensor according to claim 11, wherein the sense electrode further comprises:
   an upper portion comprising a shape corresponding to the first sensing region; and
   a middle portion comprising a second shape corresponding to the second sensing region.

14. A capacitance sensor according to claim 13, wherein the sense electrode further comprises:
   a third sensing region having a third rate of capacitance change relative to the change of position of the object within the sensing field, and wherein a second inflection point is created in the sensing field where the second and third sensing regions meet; and
   a lower portion comprising a third shape corresponding to the third sensing region.

15. A capacitance sensor according to claim 14, wherein the third rate of capacitance change is less than the second rate of capacitance change.

16. A capacitance sensor according to claim 11, wherein the second rate of capacitance change is greater than the first rate of capacitance change.

17. A method of using a capacitance sensor to detect and identify a replacement period for an object, comprising:
   positioning a sensing element having a sense electrode at least partially enclosed by a drive electrode proximate the object, wherein the sensing element generates a sensing field and the object is positioned within the sensing field;
   detecting a first rate of change of capacitance with a first sensing region of the sensing element, wherein a change of capacitance is caused by a change in position of the object within the sensing field;
   detecting a second rate of change of capacitance with a second sensing region of the sensing element;
   identifying an inflection point between the first and second sensing regions; and
   using the inflection point to differentiate between an abundant period of life for the object and a replacement period for the object.

18. A method of using a capacitance sensor according to claim 17, further comprising:
   detecting a third rate of change of capacitance with a third sensing region of the sensing element;
   identifying a second inflection point between the second and third sensing regions; and
   using the second inflection point to identify the replacement period for the object.

19. A method of using a capacitance sensor according to claim 18, wherein the third rate of capacitance change is less than the second rate of capacitance change.

20. A method of using a capacitance sensor according to claim 17, wherein the second rate of capacitance change is greater than the first rate of capacitance change.

* * * * *